June 13, 1933.    F. R. BICHOWSKY    1,913,869
REFRIGERATING APPARATUS
Filed Sept. 7, 1929    2 Sheets-Sheet 1

Francis Russell Bichowsky INVENTOR

BY

Spencer Hardman & Febr ATTORNEYS

June 13, 1933.   F. R. BICHOWSKY   1,913,869
REFRIGERATING APPARATUS
Filed Sept. 7, 1929   2 Sheets-Sheet 2

Patented June 13, 1933

1,913,869

UNITED STATES PATENT OFFICE

FRANCIS RUSSELL BICHOWSKY, OF WASHINGTON, DISTRICT OF COLUMBIA, ASSIGNOR TO FRIGIDAIRE CORPORATION, OF DAYTON, OHIO, A CORPORATION OF DELAWARE

REFRIGERATING APPARATUS

Application filed September 7, 1929. Serial No. 390,989.

This invention relates to refrigerating apparatus of the absorption type and particularly to absorbents and refrigerants for such apparatus.

One of the objects of the invention is to provide an improved absorption refrigerating apparatus which may be effectively operated with air cooling.

More specifically it is an object to provide a solid absorbent or reactant material in combination with a suitable refrigerant which may be operated at temperatures attainable with ordinary atmospheric conditions to produce temperatures suitable for refrigeration purposes.

Further objects and advantages of the present invention will be apparent from the following description, reference being had to the accompanying drawings, wherein a preferred form of the invention is clearly shown.

In refrigerating apparatus of the absorption type use is made of a reactant material, which upon being cooled absorbs or takes up a refrigerant vapor at a low pressure to permit evaporation of refrigerant at a low temperature and thus produce refrigeration. Thereafter the reactant material is heated to drive off or emit its absorbed refrigerant at a high pressure which permits the condensation of the refrigerant. It is desirable to use a solid reactant material because this type of material permits the formation of a permanent, stable, porous structure through which the refrigerant readily permeates, and because the use of a solid reactant eliminates the objectionable feature of liquid reactants, namely distilling from the solution with the refrigerant.

While absorption refrigerating machines using solid reactants have heretofore been known, it is necessary to cool these machines with water because the temperature to which the reactant must be cooled in order to take up refrigerant at a sufficiently low pressure is too low to be accomplished by air cooling. In consequence these machines are of the nature of more or less permanent installations which require water supply and waste connections. These objections seriously limit the portability of refrigerating machines and curtail their utility, as well as increase their operating cost.

My invention is concerned with providing small refrigerating plants of the solid reactant type which can be readily cooled by air and which are readily portable, have large refrigerating capacity for a unit of given size, and are economical to operate.

Figure 1:
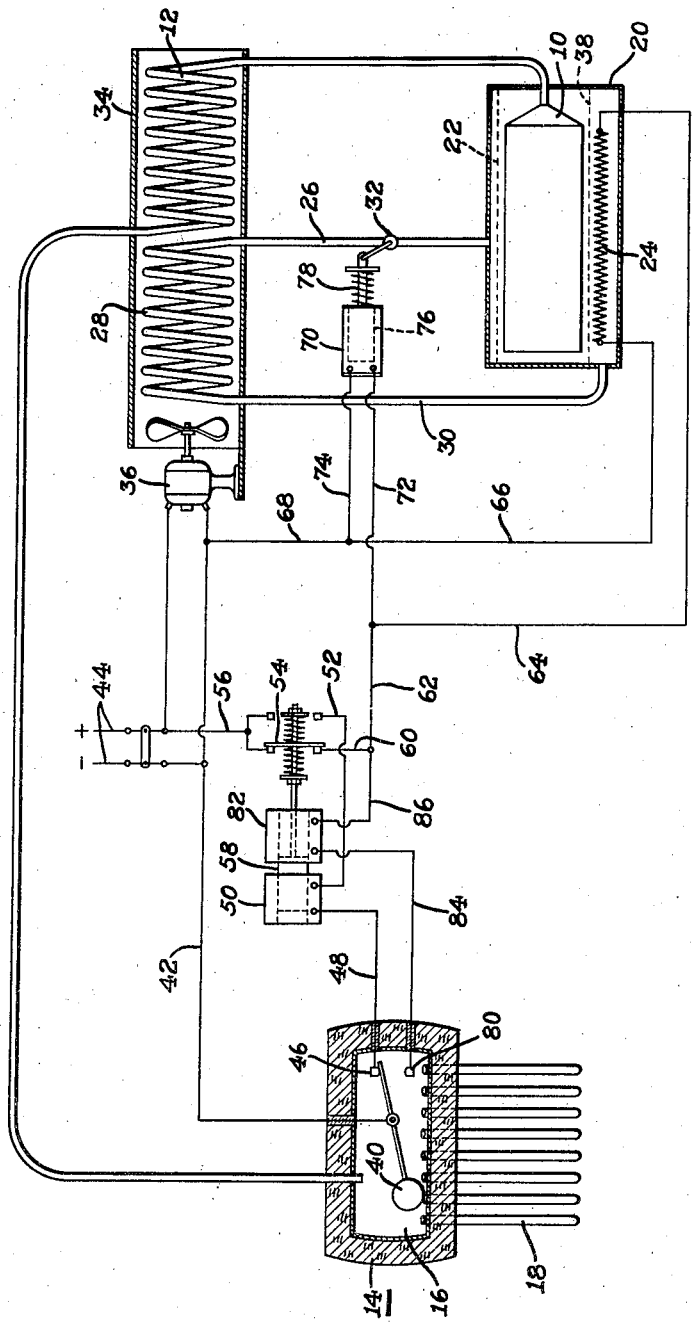
Fig. 1 is a diagrammatic representation of a refrigerating apparatus in which the invention may be employed.

Referring to Fig. 1, the generator-absorber proper is a container 10 which is filled with the solid reactant material and which may be provided with any suitable internal arrangement of plates or fins for conducting the heat throughout the reactant material. The generator-absorber may be connected through a condenser 12 to a refrigerating element in which the phase state of the refrigerant is changed to cause the refrigerant to absorb heat. This refrigerating element may be, but is not necessarily an evaporator 14. The evaporator 14 may consist of an insulated receiver 16 and refrigerant circulating tubes 18 which are exposed to the space to be refrigerated. When the generator-absorber is heated gaseous refrigerant is evolved which is condensed in the condenser 12 and flows in liquid form to the receiver 16. The tubes 18 are kept filled with liquid refrigerant at all times so that the gaseous refrigerant flowing to the condenser during the initial stage of the evolution period will not transmit heat to the space to be refrigerated, and will thus enforce condensation in the condenser. When the generator-absorber is cooled, the reactant material absorbs the refrigerant vapor, producing a low pressure throughout the refrigerant circuit which permits the evaporation of refrigerant in the receiver 16 and tubes 18. After a small amount of refrigerant has been evaporated in the receiver, its temperature is reduced to that of the tubes after which evaporation takes place in the tubes and refrigerates the space to be cooled.

Any suitable arrangement may be used for heating and cooling the generator absorber but I prefer that shown in the drawings. The generator absorber is enclosed in a vapor shell 20 which may be filled to the level 22 with any suitable volatile liquid, for example alcohol. An electric heating element diagrammatically indicated at 24 is placed in the lower part of the vapor shell. The top of the vapor shell is connected by the conduit 26 with one end of the vapor condenser 28, the other end of which is connected by conduit 30 with the bottom of the vapor shell. A valve 32 is placed in the conduit 26 for opening and closing the latter as will be explained.

A feature of the invention is the cooling of the refrigerant condenser and the generator-absorber by air. For this purpose I place the refrigerant condenser 12 and the vapor condenser 28 in a flue 34 through which a current of air is constantly circulated by fan 36. When the generator-absorber is to be heated electric current is supplied to the heating element 34 and the valve 32 is closed. The heating of the alcohol vaporizes a small quantity of the liquid and because the valve 32 is closed the vapor pressure forces the liquid alcohol through the conduit 30 up into the condenser 28. The capacities of the vapor shell and the condenser 28 are so related to each other that the condenser 28 is filled when the level of the alcohol is lowered to the line 38. Liquid alcohol is held inert in the condenser, and the liquid remaining in the shell 20 vaporizes and condenses on the surface of the generator-absorber, supplying heat to the latter. The refrigerant evolved is condensed in the condenser 12 by the current of air and flows to the evaporator.

When the generator absorber is to be cooled the heating element 24 is turned off and the valve 32 in the conduit 26 is opened. The alcohol vapor then flows up into the vapor condenser 28, and the liquid flows back to the vapor shell 20 immersing the generator-absorber to the level 22. The cold liquid alcohol is vaporized by the hot generator-absorber and the vapor flows up through conduit 26 into the condenser 28 where it is liquefied by the current of air, liquid flowing back through the shell to the pipe 30. This evaporation and condensation of the alcohol cools the generator-absorber to withdraw refrigerant from the evaporator.

Any suitable arrangement may be used for automatically controlling the heating and cooling of the generator-absorber in response to refrigerating requirements. For example a float controlled switch 40 placed in the receiver 16 is connected by a wire 42 to one side of a source of power 44. Placed in the receiver is a low level contact 46 connected by a wire 48 to one side of a solenoid 50 the other side of which is adapted to be connected through the wire 52, switch blade 54 and wire 56 with the other side of the source of power 44. When this connection is established current energizes the solenoid 50 to attract the core 58 which moves the switch 54 to the left into the position shown in the drawings. This breaks the circuit between wires 52 and 56, deenergizing the solenoid 50. The switch remains in this position and establishes a circuit to the heating element through wire 56, switch 54, wires 60, 62 and 64 to one side of the heating element 24, thence through wires 66 and 68 which are permanently connected to the source of power 44. Simultaneously the circuit is completed through the valve operating solenoid 70 as follows: wire 56, switch 54, wires 60, 62 and 72 to the solenoid thence from the solenoid by wires 74 and 68 back to the source of power. Energizing the solenoid 70 draws a plunger 76 to the left against a force of a spring 78 and closes the valve 32. Thus movement of the switch 54 to the left whenever the float 40 reaches its lower position as indicated in the figure starts a heating period and distills refrigerant into the receiver 16. When the refrigerant in the receiver reaches a predetermined high level the float switch makes contact with the high level contact 80. This establishes a circuit through another switch operating solenoid 82 as follows: from the source of power 44 through wire 42, switch 40, contact 80, wire 84 to the solenoid 82, thence from the solenoid 82 through wire 86, wire 60, switch 54, and wire 56 back to the source of power. Energizing the solenoid 82 moves the switch contact 54 to the right in the position connecting wires 56 and 52 (so that solenoid 50 may be energized when lower level is reached) and deenergizes the solenoid 82, heater 24 and valve solenoid 70, permitting the spring 78 to open the valve and permit circulation of the alcohol for cooling the generator-absorber.

Since air temperatures of 100 to 110° F. will be encountered, apparatus must be provided which will dissipate to the atmosphere at this temperature the heat absorbed from the space to be refrigerated. Since solid reactants are poor conductors of heat, in an apparatus of this type a temperature differential of 30 to 40° is required to produce satisfactorily rapid heat flow from the reactant material to the outside air. This means that the reactant material, when cooled to 140° or 150° F. must absorb the refrigerant at a sufficiently low refrigerant pressure to permit the change of phase state of the refrigerant in the refrigerating element at temperatures low enough to produce satisfactory refrigeration. Such temperatures must ordinarily be in the neighborhood of 25° F. or lower in order to freeze ice at a satisfactory rate. On the other hand, when the reactant is being heated, it must emit refrigerant vapor at a sufficiently high pressure to permit the refrigerant to change its phase state in an air cooled heat exchanger. In the illustration of the invention herein adopted, this means that the reactant must give off refrigerant vapor which can change its phase state (liquefy) in an air cooled condenser. The temperature differential which is required to remove heat from metal conduit in which gaseous refrigerant is flowing is less than that required to remove heat from solid reactant material. The temperature differential required for condensation may be for example 20°. This requires the reactant to emit refrigerant at a refrigerant pressure which will permit condensation at approximately 120° F. Obviously the temperature at which such emission takes place must be within reasonable limits which can readily be obtained in household appliances, for example 500° F.

In addition to the temperature conditions which the reactant material must meet the material must be stable throughout the range of operation of the refrigerating apparatus. That is, at the temperatures encountered, while the substances may change their chemical and physical form during different periods of operation, they must be capable of returning to their original physical and chemical condition in order that the refrigerating cycle may be repeated, and must not react with each other or with the materials of which the apparatus is constructed to form chemical compounds other than the refrigerant and reactant.

As refrigerant, I prefer to use ammonia. In order to provide suitable materials which can be used as reactants in air-cooled refrigerating machines, I have investigated the properties of a large number of chemical compounds and I find that there are a number of compounds, namely, $MnCl_2$, $MnBr_2$, $FeCl_2$, $FeBr_2$ and $CoCl_2$, which have a chemical affinity for ammonia and possess the property of uniting with the ammonia to form other chemical compounds known as addition compounds, ammines or ammoniates, in which each molecule of the substance holds in chemical combination one or a number of molecules of the refrigerant. Usually each substance mentioned is capable of combining with different numbers of molecules of the refrigerant so as to form several different addition compounds, which latter are described as of low order or high order according to whether there is a small or large number of molecules of refrigerant held in combination with each molecule of the substance. The lower order addition compounds will, under suitable conditions, absorb or combine with refrigerant to form higher order addition compounds, and thus produce refrigeration. The process is completely reversible, so that the higher order addition compounds can be dissociated into lower order addition compounds and free refrigerant which latter can be liquefied to be used again.

These substances as well as their various addition products are suitable for use as reactants in combination with ammonia.

Figure 2:
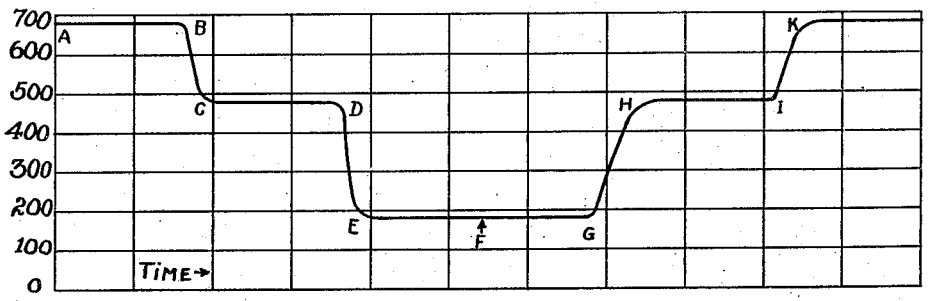
Fig. 2 is a constant pressure cooling and heating curve, showing the temperatures of a representative reactant material in absorbing and liberating a representative refrigerant.

As an example of the substance listed consider manganese chloride. This has the property of combining with ammonia, to form a variety of addition compounds. Fig. 2 shows the behavior of manganese chloride and its addition products with ammonia at various temperatures and at a pressure of one atmosphere. At a temperature of approximately 675° F. manganese chloride and gaseous ammonia are in equilibrium with each other. If the $MnCl_2$ is cooled to remove the latent heat evolved by chemical combination the two substances will combine at a constant temperature to form an addition compound of the first order, namely manganese chloride-1 ammine, of the formula $MnCl_2.NH_3$. The temperature will remain constant as shown by the portion AB of the curve as long as the heat is removed and there are $MnCl_2$ and $NH_3$ to combine. After the chemical combination is complete further cooling will reduce the temperature as indicated by the portion BC of the curve until at a temperature of approximately 485° F. the $MnCl_2.NH_3$ again combines with ammonia, forming manganese chloride-2 ammine, $MnCl_2.2NH_3$, which is an addition product of the second order. As long as the manganese chloride-1 ammine is being converted into manganese chloride-2 ammine the temperature will remain constant at 485° as shown by the portion CD of the curve. After this combination is complete, further cooling will reduce the temperatures of the mass of material as shown by the portion DE until at the temperature of approximately 185° F. the manganese chloride-2 ammine will again take up ammonia forming manganese chloride-6 ammine $MnCl_2.6NH_3$, an addition product of the sixth order. This occurs at a constant temperature as indicated by EF of the curve. Any of the addition products mentioned may be dissociated into gaseous ammonia and the addition products of the next lower order by supplying the heat of dissociation at the temperature of equilibrium. Suppose the direction of heat flow is reversed at the point F, and thereafter heat is supplied to the material. Then a molecule of manganese chloride-6 ammine at a temperature of approximately 185° F. dissociates into a molecule of manganese chloride-2 ammine and 4 molecules of gaseous ammonia. This dissociation occurs at a constant temperature as shown by the portion FG of the curve. When dissociation is complete, heating the material will increase its temperature as shown by the portion GH of the curve. At the temperature of 485° F. one molecule of manganese chloride-2 ammine breaks down into a molecule of manganese chloride-1 ammine and one molecule of ammonia. While this dissociation is taking place the temperature will remain constant and after dissociation is complete further heating will elevate the temperature as shown in the portion IK of the curve until at the temperature of 675° F. the last remaining molecule of ammonia will be evolved, the manganese chloride-1 ammine being converted into pure manganese chloride $MnCl_2$.

Figure 3:
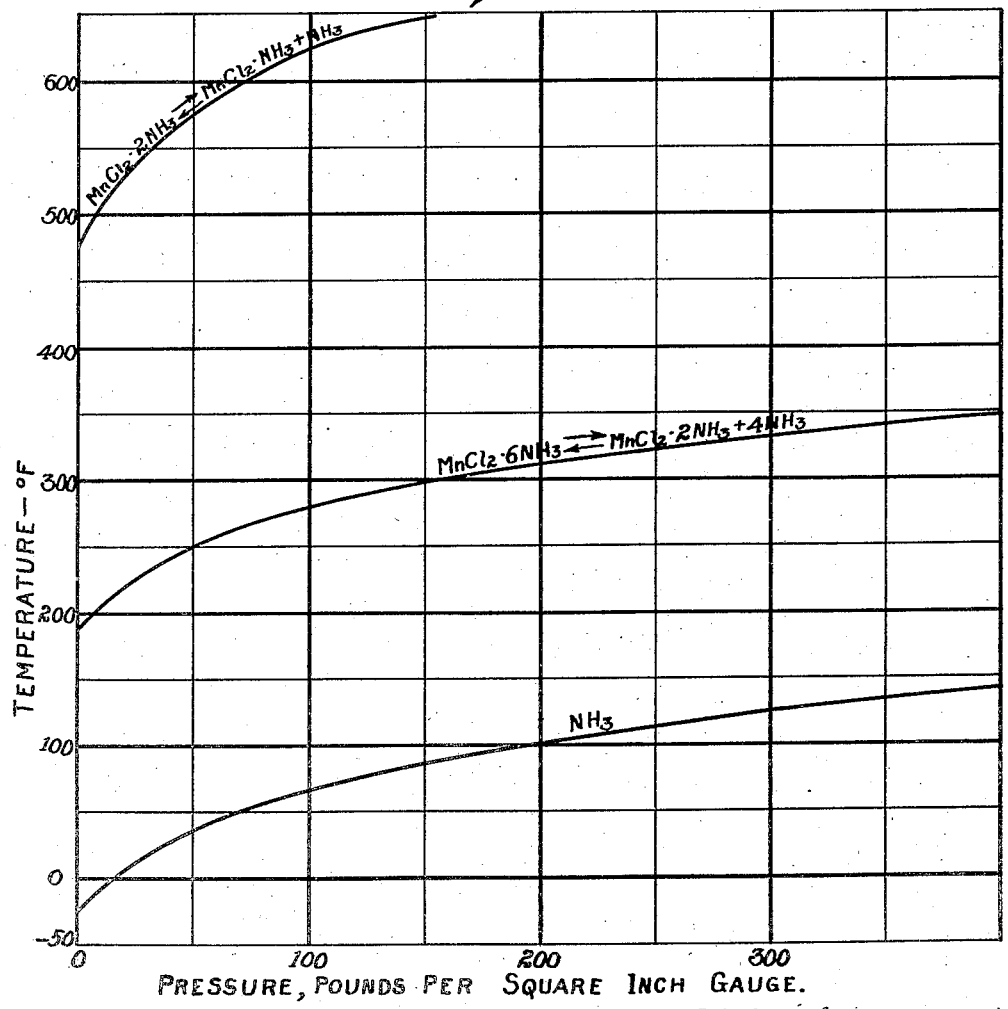
Fig. 3 is a graph showing the vapor pressure characteristics of a representative refrigerant and of a representative absorbent.

Each of the addition products is a suitable reactant to be used with the refrigerant ammonia. The temperatures at which the described reactions occur are dependent upon the pressure. Fig. 3 shows the pressures and temperatures for equilibrium conditions between ammonia and the higher addition products of manganese chloride as well as the vapor pressure characteristics of ammonia.

From this figure it will be seen that at a pressure of approximately 40 pounds per square inch gauge, ammonia boils at a temperature of approximately 25° F. Likewise at the pressure of 40 lbs. manganese chloride-6 ammine is in equilibrium with ammonia at a temperature of approximately 240°. Consequently if manganese chloride, or any of its lower-order addition products is cooled at this temperature, ammonia will be absorbed to form $MnCl_2.6NH_3$. This will permit evaporation of the ammonia at a temperature of 25°, thus producing useful refrigeration. The temperature of 240° is easily obtained in the absorber by means of the air cooling arrangement shown in Fig. 1.

Likewise from Fig. 3 it will be seen that at a pressure of 260 lbs. ammonia will condense at a temperature of approximately 120° F. At the pressure of 260 lbs. manganese chloride-6 is in equilibrium with ammonia at temperature of 320° F. Consequently if the reactant is heated to this temperature gaseous ammonia will be evolved at a sufficiently high pressure to be condensed in a condenser cooled at 120°.

It will be observed that for each molecule of the reactant four molecules of ammonia are cyclically emitted and absorbed. The molecular volume of $MnCl_2$ is approximately twice that of ammonia, so that the product $MnCl_2.6NH_3$ may be said to have a unit molecular volume of 8 with reference to ammonia. Four molecules of ammonia being cycled, it will be evident that 50% of the volume of the saturated reactant is available refrigerant. This provides an absorbent of relatively large refrigerating capacity per unit volume.

Manganese chloride and ammonia are explained merely for illustration of the reactions which occur, but it will be understood that the invention may be practiced with other reactant and/or refrigerants.

The salts listed all behave in the same general way with the ammonia as does manganese chloride, the reactions taking place at differing temperatures and pressures and involving differing amounts of reactant and refrigerant.

However, all of the substances listed and/or some of their addition products when cooled to temperatures not less than 140° F. absorb satisfactory quantities of ammonia at pressures of 40 pounds gauge or less (and thus provide refrigerating temperatures of 25° F. or less), and the addition products so formed, when heated to temperatures below 500° F., evolve the absorbed ammonia at a pressure of 260 pounds gauge or more, which permits the ammonia to be condensed at a temperature not less than 120° F. Consequently any of these substances are adapted to be used as absorbents or reactants in air-cooled refrigerating apparatus wherein ammonia is used as the refrigerant.

The invention has been illustrated as applied to a refrigerating system in which refrigeration is produced by the evaporation of a liquid refrigerant. However, the invention is not limited to such systems, but is applicable to any system in which the phase state of the refrigerant is changed to absorb heat. For example, the invention may be applied to systems in which the refrigerant changes from a solid phase to a vapor phase in the refrigerating element.

Furthermore, the invention is not limited to any particular form of apparatus, nor to any specific materials, but embraces such apparatus and materials as fall within the scope of the following claims.

I claim:

1. Refrigerating apparatus of the intermittent absorption type including a generator-absorber and an evaporator, means for heating and cooling said generator-absorber including a closed circuit containing the volatile fluid, said circuit having a porton in heat exchange relation with the generator-absorber and a portion remote from the generator-absorber and constituting a condenser, means for heating said circuit and means for air cooling said condenser portion.

2. Refrigerating apparatus of the intermittent absorption type including a generator-absorber and an evaporator, means for heating and cooling said generator-absorber including a closed circuit containing a volatile fluid, said circuit having a portion in heat exchange relation with the generator-absorber and a portion remote from the generator-absorber and constituting a condenser, means for heating said circuit and means for air cooling said condenser portion, said circuit having a valve therein and means automatically operated in response to the level of liquid in said evaporator for closing said valve during the heating period.

3. Refrigerating apparatus of the intermittent absorption type including a generator-absorber, a condenser and an evaporator, means for heating and cooling said generator-absorber including a closed circuit containing a volatile fluid, said circuit having a portion in heat exchange relation with the generator-absorber and a portion remote from the generator-absorber and constituting a secondary condenser, a flue enclosing said primary and secondary condensers and means for circulating air through said flue for cooling said condensers.

4. Refrigerating apparatus of the intermittent absorption type including a generator-absorber, a condenser and an evaporator, means for heating and cooling said generator-absorber including a closed circuit containing a volatile fluid, said circuit having a portion in heat exchange relation with the generator-absorber and a portion remote from the generator-absorber and constituting a secondary condenser, means for heating said circuit and means for air cooling said condenser, said secondary condenser, and means responsive to the level of liquid in said evaporator for automatically starting and stopping said second named heating means.

5. Refrigerating apparatus of the intermittent absorption type including a generator-absorber, a condenser, and an evaporator, means for heating and cooling said generator-absorber including a closed circuit containing a volatile fluid, said circuit having a portion in heat exchange relation with the generator-absorber and a portion remote from the generator constituting a secondary condenser, means for heating said circuit and means for air cooling said condensers.

In testimony whereof I hereto affix my signature.

FRANCIS RUSSELL BICHOWSKY.